United States Patent [19]

Hirohama

[11] Patent Number: 5,797,125
[45] Date of Patent: Aug. 18, 1998

[54] VOICE GUIDE SYSTEM INCLUDING PORTABLE TERMINAL UNITS AND CONTROL CENTER HAVING WRITE PROCESSOR

[75] Inventor: Tsutomu Hirohama, Tokyo, Japan

[73] Assignee: Videotron Corp., Tokyo, Japan

[21] Appl. No.: 399,340

[22] Filed: Mar. 6, 1995

[30] Foreign Application Priority Data

Mar. 28, 1994 [JP] Japan .................... 6-080909

[51] Int. Cl.[6] .................... G10L 5/02; G10L 9/00; H04Q 7/00
[52] U.S. Cl. .................... 704/277; 340/825.25
[58] Field of Search .................... 395/2.86, 2.82, 395/2.83, 2.84, 2.85, 2.87, 2.59, 2.64, 2.1; 381/51, 39, 50; 455/18, 49.1, 50.1; 340/825.25; 370/85.1; 434/319

[56] References Cited

U.S. PATENT DOCUMENTS

| | | | |
|---|---|---|---|
| 3,781,479 | 12/1973 | Swoboda | 395/2.1 |
| 3,934,202 | 1/1976 | Missale | 455/50.1 |
| 4,163,123 | 7/1979 | Brodsky et al. | 370/85.1 |
| 4,424,415 | 1/1984 | Lin | 381/39 |
| 4,661,915 | 4/1987 | Ott | 381/51 |
| 4,824,375 | 4/1989 | Weiner | 434/319 |
| 5,152,003 | 9/1992 | Poch | 455/18 |
| 5,214,793 | 5/1993 | Conway et al. | 455/49.1 |
| 5,461,371 | 10/1995 | Matsumoto et al. | 340/825.25 |

*Primary Examiner*—Allen R. MacDonald
*Assistant Examiner*—Patrick N. Edouard
*Attorney, Agent, or Firm*—Wenderoth, Lind & Ponack

[57] ABSTRACT

Identification code transmitting units are respectively installed in different guide areas and respectively transmit different identification codes. Each of plural portable terminal units includes a memory for storing plural pieces of guide information respectively associated with the different guide areas in any one of different languages, a receiver for receiving the identification code transmitted by any one of the transmitting units, a selector for selecting one of the plural pieces of guide information according to the received identification code, and a voice generator for generating a voice corresponding to the selected piece of guide information. A control center also includes a memory for storing the plural pieces of guide information in each of the different languages, and a write processing device for selecting one of the languages according to a user command and then writing the plural pieces of guide information of the selected language from the memory thereof into the memory of any one of the terminal units.

2 Claims, 3 Drawing Sheets

F I G. 3
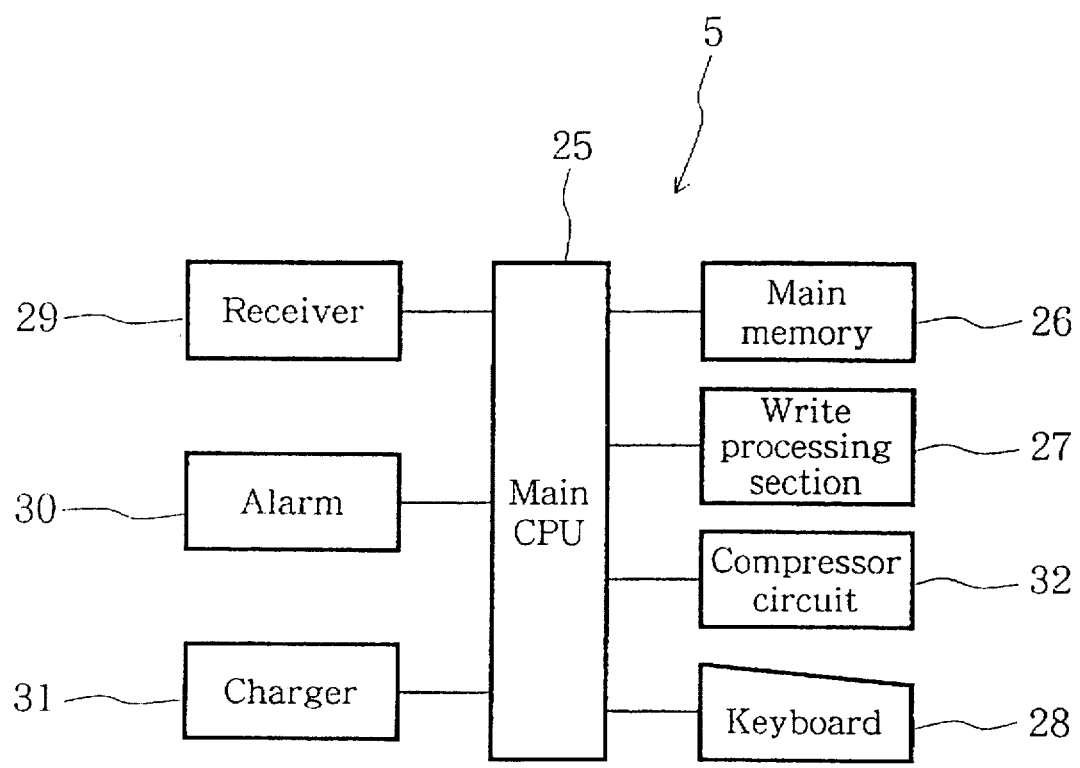

5,797,125

VOICE GUIDE SYSTEM INCLUDING PORTABLE TERMINAL UNITS AND CONTROL CENTER HAVING WRITE PROCESSOR

BACKGROUND OF THE INVENTION

1. Field of the Invention

This invention relates to a voice guide system, and in particular, to a voice guide system well suited for use at a variety of exhibition rooms, event halls, etc.

2. Prior Art

Conventionally, in a variety of exhibition rooms, event halls, etc. provided with more than one booth (exhibition zone), explanation of the contents of individual booths for the visitors has been performed by playing back a previously prepared voice tape and sending the sound to speakers or earphones.

Consequently, a problem has been presented in that a visitor to a particular booth who has never listened to the explanation of the contents of the booth and starts observing the booth from the middle of the explanation is forced to listen to the explanation from the middle and thus cannot understand the contents sufficiently.

Recently, in the field of voice processing technology, voice compression techniques have improved, allowing a large amount of voice information to be recorded on a storage device of a relatively small size. Highly integrated semiconductor devices have become more compact and require less power making it possible to store not only voice information but also programs playback program in portable terminal units.

Internationalization has progressed also in Japan, and visitors of a wide variety of races tend to come to exhibition rooms, event halls, etc., thus, conventional guide systems using a voice tape for explaining the contents of individual booths cannot sufficiently cope with the situation.

SUMMARY OF THE INVENTION

Having been achieved in consideration of the above-stated situation, this invention intends to offer a voice guide system which can provide convenience for individual visitors to a variety of exhibition rooms, event halls, etc. to comprehend the contents of a guidance and which can accommodate internationalization by permitting a guide in more than one language to be made as required.

The voice guide system in FIGS. 1 and 2 has more than one identification code transmitting unit 3A to 3N each installed in a particular guide area to transmit a particular identification code, and a terminal unit 4A equipped with a storage means 12 for storing specific pieces of guide information for said more than one guide area in any one of more than one language; a selection means 13 for selecting any one of said more than one guide area; a voice generation means 14 for generating a voice; a control means 11 for receiving the identification code from said identification code transmitting unit 3A to 3N and, on the basis of the pertinent guide area having been selected with said selection means 13, reading out said guide information from the storage means 12 to deliver it to the voice generation means 14 for voicing.

BRIEF DESCRIPTION OF THE DRAWINGS

FIG. 3 is a block diagram of the center in the preferred embodied systems of the present invention.

DETAILED DESCRIPTION OF THE INVENTION

Figure 1:
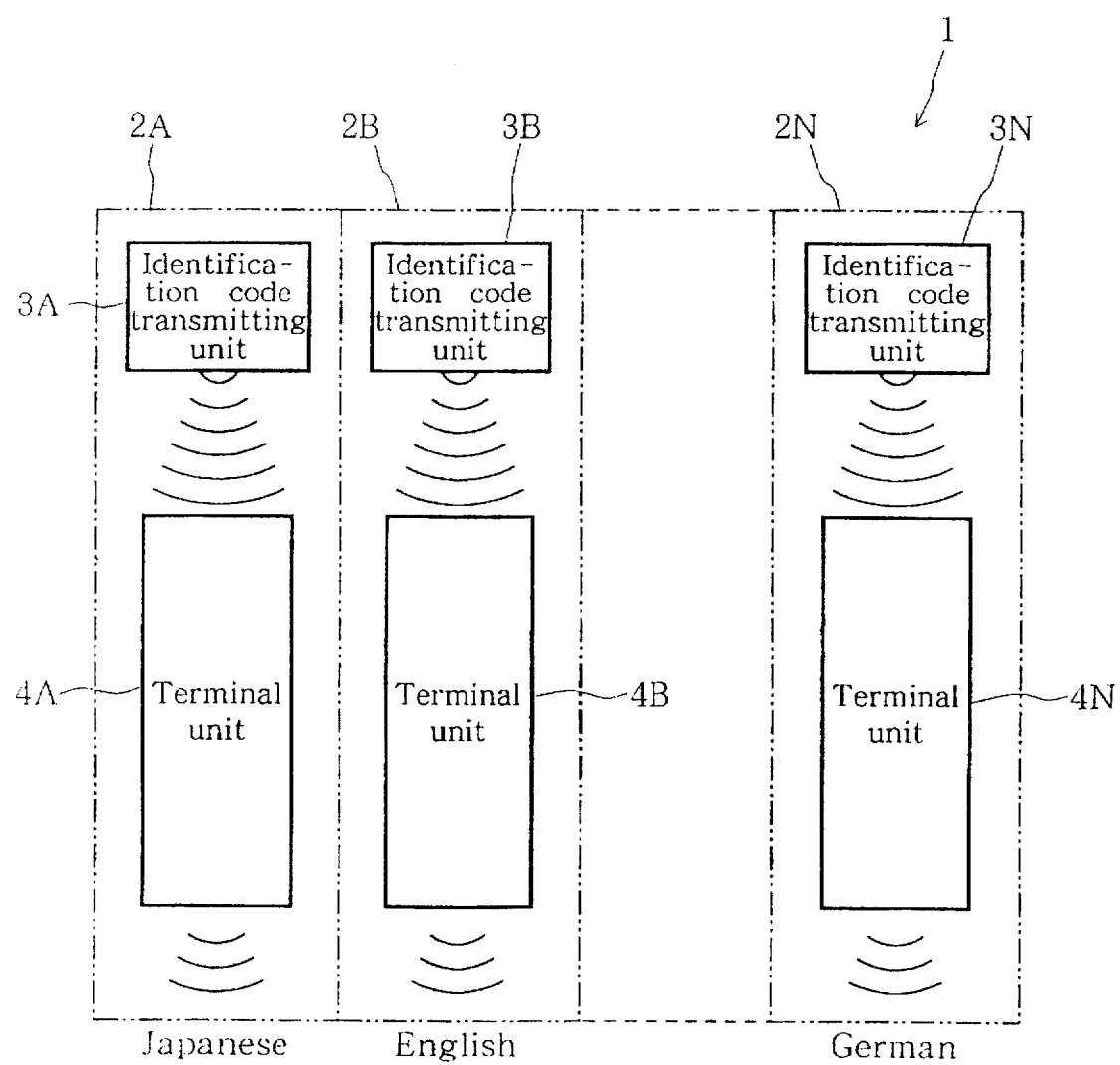
FIG. 1 is a schematic layout drawing of the preferred embodied systems of the present invention.

The voice guide system of the invention includes plural identification code transmitting units each installed in a particular guide area and each transmitting a particular identification code, and a terminal unit provided with a storage means for storing specific pieces of guide information for said more than one guide area in any one of more than one language; a selection means for selecting any one of said more than one guide area; a voice generation means for generating a voice; a control means for receiving the identification code from said identification code transmitting unit and, on the basis of the pertinent guide area having been selected with said selection means, reading out said guide information from the storage means to deliver it to the voice generation means for voicing.

The voice guide system is configured so that guide information in any one language is stored by said storage means as it is or after being compression-processed and, on the basis of the pertinent guide area having been selected with said selection means, said control means in the terminal unit reads out said guide information, and delivers it, as it is or after expansion processing it, to the voice generation means for voicing.

The function of each invention configured as stated above will be described here.

Each of the more than one identification code transmitting unit in the voice guide system each installed in a particular guide area transmit particular identification code (address information).

The control means in the terminal unit receives the identification code from any one identification code transmitting unit and, on the basis of the pertinent guide area having been selected with said selection means, reads out said guide information from the storage means to deliver it to the voice generation means for voicing.

Thus, individual visitors can listen to the guide information in the desired language for a particular guide area from the beginning, and therefore, it is possible to provide convenience for individual visitors to a variety of exhibition rooms, event halls, etc. to comprehend the contents of a guidance, and to allow guide in the desired language by selecting the proper terminal unit and thus accommodate internationalization.

With the voice guide system guide information in any one language is stored by said storage means as it is or after being compression-processed and, on the basis of the pertinent guide area having been selected with said selection means, said control means in the terminal unit reads out said guide information, and delivers it, as it is or after expansion processing it, to the voice generation means for voicing; therefore, the voice guide system can function and, especially when the compression and expansion processing capabilities are utilized, the time required for storing guide information in the storage means in the terminal unit can be shortened.

By referring to the attached drawings, the preferred embodiments of the voice guide system of this invention will be described in detail below.

The voice guide system 1 as shown in FIG. 1 is provided with identification code transmitting units 3A to 3N installed respectively in the 1st to Nth booths or guide areas 2A to 2N of an exhibition room or event hall, and terminal units 4A to 4N. The system also includes a control, a center 5 (FIG. 3) installed at a specified location such as the entrance in the exhibition room or event hall, etc.

Figure 2:
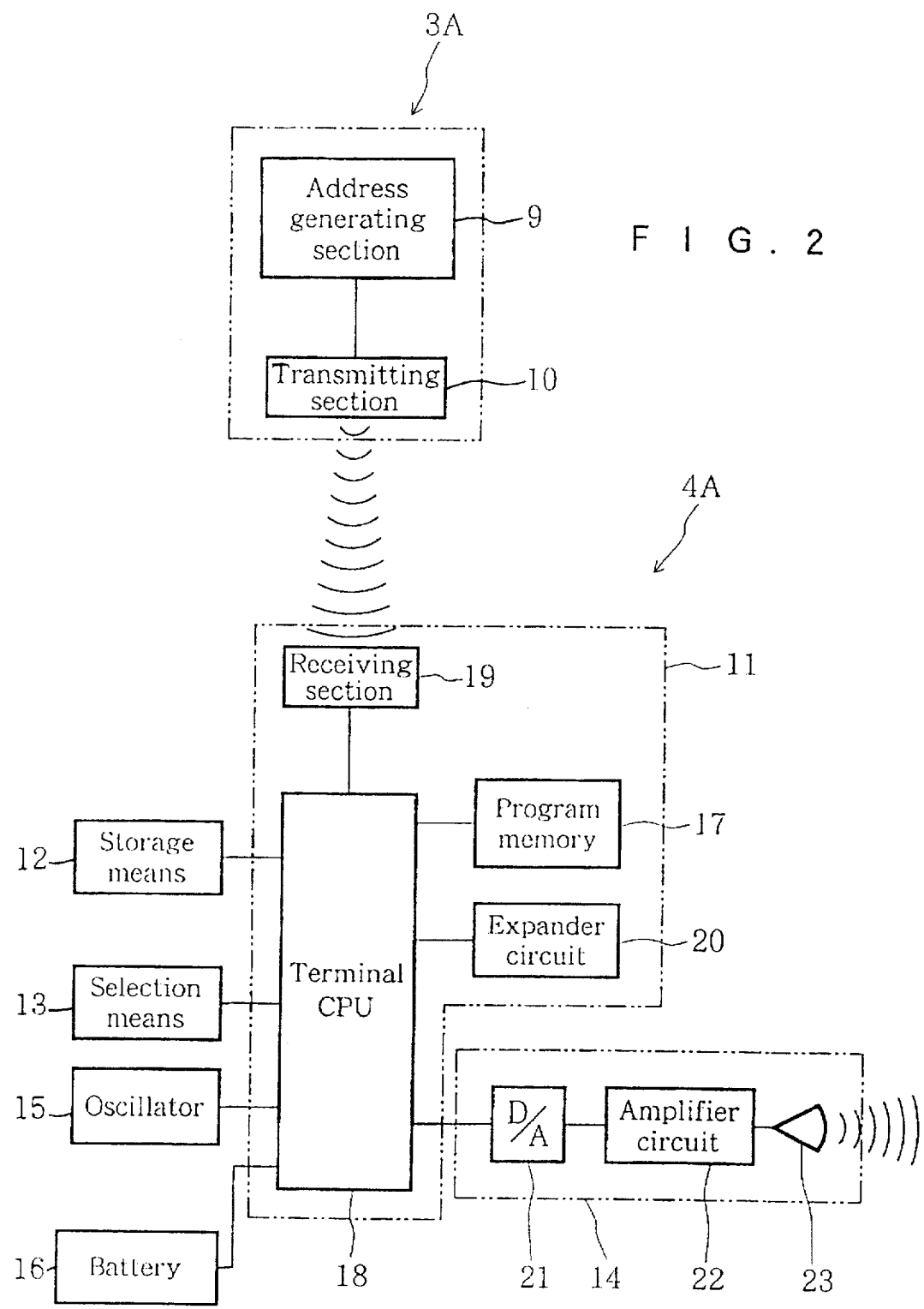
FIG. 2 is a block diagram of the identification code transmitting unit and terminal unit in the preferred embodied systems of the present invention.

As shown in FIG. 2, the identification code transmitting unit 3A (this description is also applicable to units 3B to 3N) is provided with an address generating section 9 which generates address information (such as the 1st booth, 2nd booth, etc.) providing a identification code for a particular guide area and a transmitting section 10 which transmits (by infrared light emission) address information generated by the address generating section 9.

As also shown in FIG. 2, the terminal unit 4A (this description is also applicable to units 4B to 4N) is provided with a control means 11 receiving (by infrared light reception) and processing address information from the identification code transmitting unit 3A. Coupled to the control means 11 are a storage means 12 in which specific pieces of guide information for individual booths 2A to 2N are each stored in any one of more than one language (any one of various languages such as Japanese, English, German, and French) in a compressed or non-compressed state; a selection means 13 consisting of, for example ten keys, for selecting any one of the 1st to Nth booths 2A to 2N; a voice generation means 14 for generating a voice an oscillator producing a signal having a specific frequency; and a battery 16.

The control means 11 includes a program memory 17 which stores a control program; a terminal CPU 18 which controls the entire unit on the basis of the control program; a receiving section 19 which receives guide information by infrared light from said transmitting section 10 and converts the received light into an electrical signal (digital signal) to be delivered to the terminal CPU 18; and an expander circuit 20 which carries out an expansion process of the guide information which has been compression-processed.

The voice generation means 14 includes a D/A converting section 21 which converts digital guide information into analog information; an amplifier circuit 22; and an earphone 23.

As shown in FIG. 3, the control center 5 includes a main CPU 25; a main memory 26 which stores more than one specific pieces of guide information for individual booths 2A to 2N each in more than one language; a write processing section 27 which writes into the storage means 12 in said terminal unit 4A, etc. in a particular language (for example, Japanese for the storage means 12 in the terminal unit 4A, English for the storage means 12 in the terminal unit 4B, German for the storage means 12 in the terminal unit 4N, etc.); a keyboard 28; a receiver 29 which receives a signal from the oscillator 15 in said terminal unit 4A, etc.; an alarm 30, such as a buzzer, which gives an alarm resulting from the signal reception by the receiver 29; a charger 31 which charges the battery 16 in said terminal unit 4A, etc.; and a compressor circuit 32 which performs compression processes of the guide information stored in the main memory 26, as required, to deliver it to the write processing section 27 for writing processing.

Here is a description of the operation of said voice guide system 1.

At the center 5, in accordance with the request of a particular visitor to a exhibition room, event hall, etc., any one of the terminal units 4A to 4N that has already stored guide information in any one language is passed to the visitor.

Assume that a Japanese visitor who carries the terminal unit 4A having prestored Japanese language guide information enters the 1st booth 2A. The identification code transmitting unit 3A continues to transmit the address information indicating that the booth is the 1st one 2A, thus, when said receiving section 19 receives address information, thus terminal CPU 18 receives the address information from the identification code transmitting unit 3A and, on the basis of the selection by said visitor, reads out the guide information in Japanese for the 1st booth from said storage means 12 to deliver it to the D/A converting section 21 in the voice generation means 14. The guide information in Japanese which is converted into analog information by the D/A converting section 21 is amplified by the amplifier circuit 22 for voicing from the earphone 23 inserted into an ear of the visitor.

Thus, said visitor can listen to the guide information in Japanese, the desired language, for the 1st booth from the beginning, therefore, inconvenience of listening to the guide from the middle as with conventional systems can be eliminated.

Likewise, when an American visitor who carries the terminal unit 4B which has already stored guide information in English enters the 2nd booth 2B, he can listen to the guide information in English, the desired language, for the 2nd booth 2B from the beginning, and when a German visitor who carries the terminal unit 4N which has already stored guide information in German enters the Nth booth 2N, he can listen to the guide information in German, the desired language, for the 2nd booth 2N from the beginning.

Thus, the individual visitors can listen to the specific pieces of guide information in the desired language for the booths 2A to 2N from the beginning, and therefore, it is possible to provide convenience for individual visitors to a variety of exhibition rooms, event halls, etc. to comprehend the contents of a guidance, and to offer convenience not only to Japanese visitors but also to visitors from various foreign countries by making guide in more than one language for the booths 2A to 2N and thus accommodate internationalization.

It is also possible to configure the voice guide system 1 so that, in storing a particular piece of guide information in the storage means 12 in said terminal units 4A to 4N, the guide information is compression-processed by the compressor circuit 32 under the control of the main CPU 25 to deliver it to the write processing section 27 for writing processing, and store it in the compression-processed state in the storage means 12, and at reproduction of the guide information with the terminal units 4A to 4N, the guide information is expansion-processed by the expander circuit 20, and by doing so, the time required for storing a particular piece of guide information in the storage means 12 in the terminal units 4A to 4N can be shortened.

With the voice guide system 1, the identification code is sent from transmitting section 10 to receiving section 19 as a piece of light information, thus, crosstalk between channels is eliminated and there is no possibility of being influenced by radio interference, etc.

In addition, by causing a signal from the oscillator 15 in the terminal units 4A, etc., to be received by the receiver 29 and an alarm to be given by the alarm 30, the terminal units 4A, etc. can be prevented from being carried out and stolen.

In addition, while keeping the terminal units 4A, etc. at the center 5, said write processing section 27 and the keyboard 28 can be used to store specific pieces of guide information in the terminal units 4A, etc. while charging the battery 16 in the terminal units 4A by use of the charger 31.

This invention is not limited to the above-stated embodiments, but permits various variants to be embodied within the scope of the claims.

For example, said voice guide system 1 can be configured so that the main CPU 25 and the main memory 26 at the control center 5 can be used to make such operations as giving the total number of visitors to an exhibition room, event hall, etc., and the total numbers of visitors to the respective booths or the total times of stay in the respective booths, etc. The voice guide system can also be configured so that it allows making an interruption guide, etc. for such a purpose as informing the members of a group of visitors of the meeting time.

This invention described above in detail provides the following effects:

With the invention, a voice guide system can be offered which allows the individual visitors to listen to the specific pieces of guide information in the desired language for the guide areas from the beginning, and therefore, providing convenience for individual visitors to a variety of exhibition rooms, event halls, etc. to comprehend the contents of a guidance, and making guide in more than one language and thus accommodating internationalization.

Also with the invention, a voice guide system can be offered which allows shortening the time required for storing a particular piece of guide information in the storage means 12 in the terminal units 4A to 4N.

What is claimed is:

1. A voice guide system comprising:

a plurality of identification code transmitting units respectively installed in a plurality of different guide areas and respectively transmitting a plurality of different identification codes;

a plurality of portable terminal units each comprising (a) a first storage means for storing plural pieces of guide information respectively associated with said plurality of different guide areas in any one of plural different languages, (b) a receiving means for receiving an identification code transmitted by any one of said plurality of transmitting units, (c) a selecting means for selecting one of said plural pieces of guide information stored in said storage means according to the identification code received by said receiving means, and (d) voice generating means for generating a voice corresponding to said one of said plural pieces of guide information selected by said selecting means; and a control center comprising (a) a second storage means for storing said plural pieces of guide information in each of said plural different languages, and (b) a write processing means for selecting one of said plural different languages according to a user command and writing said plural pieces of guide information of the selected one of said plural different languages from said second storage means into said first storage means of any one of said plurality of terminal units.

2. A voice guide system as claimed in claim 1, wherein said control center further comprises a compression means for compressing the pieces of guide information written into said first memory of said any one of said plurality of terminal units.

* * * * *